Jan. 14, 1936.  C. F. CARLOTTI  2,027,720
WIND SCREEN
Filed Nov. 10, 1933
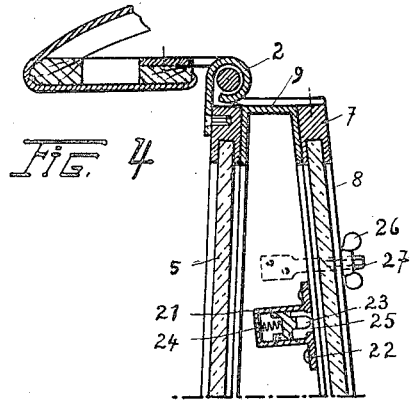
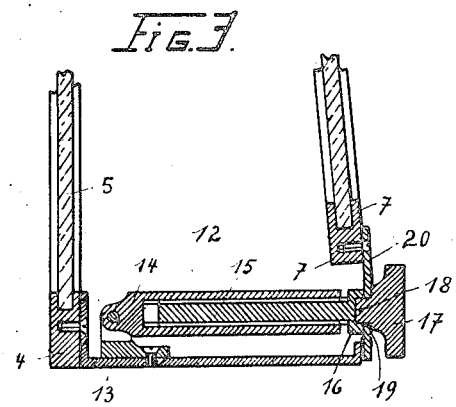
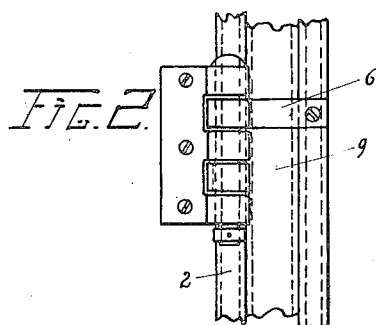
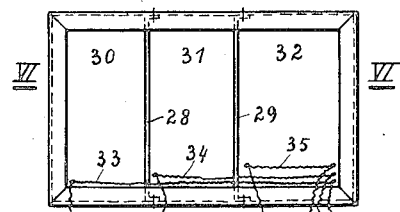
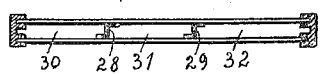
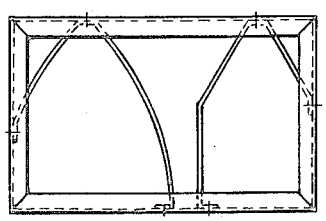
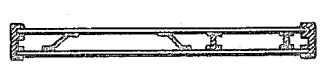
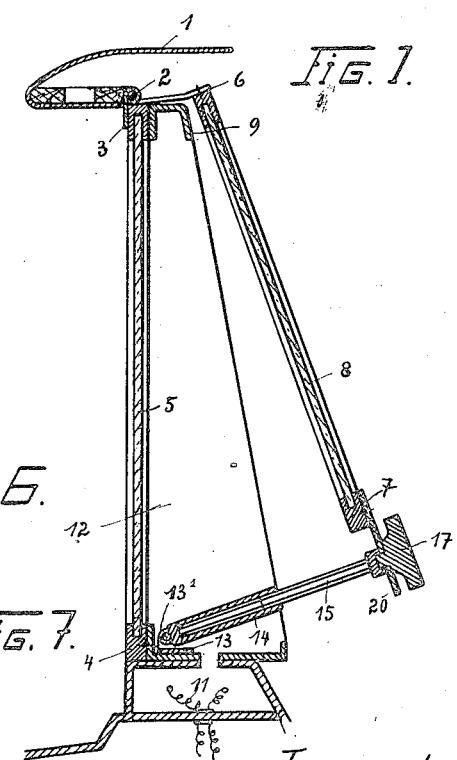
Inventor
Charles F. Carlotti
By
Waldo M. Chapin
Atty.

UNITED STATES PATENT OFFICE 2,027,720

WIND SCREEN

Charles François Carlotti, Brussels, Belgium

Application November 10, 1933, Serial No. 697,439
In Germany November 11, 1932

4 Claims. (Cl. 20—40.5)

My invention relates to improvements in wind screens, such as are used for instance on motor cars and other vehicles, comprising two or more walls which are parallel or not, and which form chambers which are eventually heated in order to avoid the formation of steaming on the walls.

Wind screens are known which are mounted so as to enable the driver eventually to open the wind screen when desired. The wind screens of that kind generally comprise numerous hinges, some of which determine the fixation of one of the walls to the coach work of the vehicle, while the others are used in order to fix the other walls on the frame of the neighbouring wall.

Moreover, in the case of heated chambers, the aeration of the chambers formed by the walls takes place with difficulty, when it is desired to avoid the formation of steaming in case of stopping of the heating system, and renders necessary nearly always the stopping of the vehicle in order to open the chambers.

Finally, as in the case of the use of electric heating the available electricity is very limited, especially in the winter and during the night, it is necessary to use the available heat to the best advantage, and, during very cold weather, the driver of a vehicle cannot always obtain a perfect visibility by means of the wind screens which are now in use.

My invention has for its object to obviate those drawbacks and to improve the construction of the wind screens, so as to enable the driver to keep the walls of the wind screen quite transparent, without being obliged to leave his seat and to stop the running of the vehicle.

With this object in view, my invention essentially consists in the special arrangements and combinations of parts hereinafter fully described and pointed out in the appended claims.

On the annexed drawing:

Figure 1 shows in cross section a wind screen constructed according to the invention.

Figure 2 is a top view at an enlarged scale of the hinge supporting the walls of the wind screen.

Figure 3 is a detail view of the device rendering possible the opening of the inner chamber of the wind screen.

Figure 4 shows in cross section another form of embodiment of the device for opening the inner chamber.

Figures 5, 6, 7, and 8 show diagrammatically the division of the inner chamber into several compartments.

On the drawing, 1 designates the coach work of a vehicle on which is fixed the pin 2 of a hinge to which is suspended through a plate 3 the frame 4 containing an external glass plate or wall 5; on the pin 2 of the hinge is mounted a branch 6 to which is fixed the frame 7 of an inner glass plate or wall 8. On the external frame 4 is fixed a supporting member 9 comprising an inclined face 10 on which the inner glass plate or wall 8 is adapted to rest. A heating system 11 is provided at the bottom of the chamber 12 which is formed between the two glass plates 5 and 8.

On a base 13 is adapted to oscillate on a pivot 13¹ a bushing 14 provided inside with a screw thread in which is engaged a screwed rod 15 provided with a shoulder 16 and ended by a knob 17 fixed by means of a pin 18. A groove 19 is formed between the shoulder 16 and the knob 17 and receives a plate 20 fixed on the inner frame 7.

When the chamber 12 must be opened, for instance, when there is a break down in the heating, and the walls begin to be covered with steam, it is only necessary to untighten the screwed rod 15 by causing the knob 17 to rotate. The rod 15 causes the glass plate 8 to be moved away and the latter leaves the supporting member 9 while rotating around the pin 2 of the supporting hinge.

The bushing 14 is consequently tilted so as to follow the movement of the rod 15 which is inclined while the glass plate 8 is tilted.

When the chamber is opened in this way, it may be ventilated by the free circulation of air therein, the glass plates being held away from each other.

In the form of embodiment shown on Figure 4, use is made of a pusher or of a plurality of pushers constituted by a casing 21, fixed on the supporting member 9 by means of screws 22, and within the casing 21 a pusher 23 responsive to the action of a spring 24. The head of the said pusher 23 is engaged into an opening 25 of the casing 21. One or more nut-screws 26, mounted each on a rod 27 fixed on the sides of the member 9, operate to firmly seat the frame 7 against the supporting member 9 or, when the screws are untightened, to render possible the oscillation of the glass plate 8 around the hinge under the action of the pusher 23.

During very cold weather or in case it is desirable to conserve the available supply of heat for any reason, it may be advisable to heat only a portion of the said chamber so as to ensure an efficient action of the heating on the walls of the wind screen. To this end, the chamber is divided, as shown in Figures 5 to 8, into a number of compartments by walls 28—29 for instance, which are fixed on the supporting member of the outer wall. The compartments 30, 31, 32 which are formed in this way are provided with heating wires 33, 34, 35 which are disposed so as to heat only one compartment or two compartments or all the compartments.

The inner walls 28 and 29 could be inclined with respect to the walls and instead of being rectilinear they could be curved or constituted by two portions forming an angle the one with respect to the other, as shown on Figures 7 and 8.

It is easy to understand that the improvements hereinabove described increase in a large measure the comfort resulting from the great facility of the operations to be effected in order to obtain the maximum of visibility.

The new fixing system of wind screen by means of a single hinge has a double function: it renders possible at the same time the oscillation of the whole of the wind screen comprising a plurality of glass plates, and an easy opening of the closed chamber 12. It simplifies the systems which have been used until now and produces an important economy in view of the fact that it is no longer necessary to make use of a plurality of hinges arranged on the coach work and on the framework of the glass plates. When the chamber is opened, the air is permitted to circulate freely between the walls. Moreover, the vehicle can continue its way, the chamber being open, which renders impossible any formation of steaming which could darken the view.

Moreover, in view of the partitions provided in the chamber, it is possible to heat according to the weather temperature and the available quantity of heat, either the whole of the wind screen or only a portion, so as to secure always a surface free of steaming in front of the driver.

What I claim is:

1. In a vehicle wind screen comprising two glass plates constituting walls whereby a chamber is formed, and heating means arranged below the said glass plates, means whereby the said glass plates are adapted to be set apart swingingly the one from the other, the said means comprising a single hinge pin fixed on the coach work of the vehicle and branches of hinges to which different walls are fixed whereby the said branches are adapted to oscillate around the said single pin, a pin in the bottom of one of the chambers, a bushing adapted to oscillate around the said pin, a screw threaded rod engaged in the said bushing and fixed on one of the said glass plates whereby when the chamber is opened the said bushing is adapted to follow the glass plate during its oscillation.

2. In a vehicle wind screen comprising two glass plates whereby a chamber is formed, and heating means arranged at the bottom of the chamber, means whereby the glass plates are adapted to be set apart swingingly the one from the other and means whereby the chamber is divided into several compartments extending vertically side by side and a portion only of the chamber is adapted to be heated, selectively.

3. In a vehicle wind screen comprising two glass plates whereby a chamber is formed, and heating means arranged at the bottom of the chamber, a single pin fixed on the coach work of the vehicle and branches of hinges to which the different glass plates are fixed and adapted to oscillate around the said pin, a supporting member provided with an inclined face and against which the inner glass plate is adapted to rest in the closed position.

4. In a vehicle wind screen comprising two glass plates whereby a chamber is formed, and heating means arranged at the bottom of the chamber, rods fixed on the frame of the inner glass plate, screws mounted on the said rods whereby the said inner glass plate is adapted to be applied against the said supporting member and springs whereby when the screws are untightened the oscillation of the inner glass plate is effected.

CHARLES FRANÇOIS CARLOTTI.